United States Patent [19]

Nazar et al.

[11] Patent Number: 4,765,934

[45] Date of Patent: Aug. 23, 1988

[54] POLYSTYRENE BEAD EXPANSION PROCESS

[75] Inventors: Steven E. Nazar, Toronto; Jacob Leidner, North York; Ferdinand M. Svirklys, Scarborough, all of Canada

[73] Assignee: Dominion Al-Chrome Corporation, Toronto, Canada

[21] Appl. No.: 86,875

[22] Filed: Aug. 19, 1987

[51] Int. Cl.$^4$ .......................... C08J 9/24; B29C 35/12
[52] U.S. Cl. ...................................... 264/26; 264/45.4; 264/46.6; 264/51; 521/57; 521/58; 521/60; 521/915
[58] Field of Search ............................ 521/57, 58, 60

[56] References Cited

U.S. PATENT DOCUMENTS

| | | | |
|---|---|---|---|
| 3,878,133 | 4/1975 | Rubens | 521/54 |
| 4,361,656 | 11/1982 | Mostafa | 521/57 |
| 4,424,286 | 1/1984 | Nakagawa et al. | 521/58 |
| 4,430,450 | 2/1984 | Senda et al. | 521/57 |

*Primary Examiner*—Morton Foelak
*Attorney, Agent, or Firm*—Sim & McBurney

[57] ABSTRACT

Polystyrene beads or beads of other thermoplastic material are expanded to a consolidated foam structure in a hollow cavity of a marine float or other structure by providing the beads with a uniform coating of a saturated brine solution or other aqueous solution of water-soluble salt and exposing the solution to microwave energy to boil the solutioln and thereby heat the beads to cause expansion and fusion to a foam structure.

11 Claims, No Drawings

POLYSTYRENE BEAD EXPANSION PROCESS

FIELD OF INVENTION

The present invention relates to a novel method of expanding thermoplastic, particularly polystyrene, beads to achieve foam formation using microwave energy.

BACKGROUND TO THE INVENTION

In U.S. Pat. No. 4,655,156, the disclosure of which is incorporated herein by reference, there is described a flotation system based on modular floats. Such floats are generally hollow and are formed of polymeric material, usually polyethylene, typically by blow molding, although other techniques, such as roto-molding may be used.

Certain jurisdictions do not permit hollow floats to be employed in docks and the like, in view of a perceived danger of flooding upon puncture or fracture, and such hollow floats usually are foam filled for such jurisdictions. Foam filling can be effected by forming polyurethane foam in situ. Polyurethane foam formation is relatively easy to perform in the enclosed environment of the interior of the float but suffers from the drawback that the reactants are relatively expensive when compared with other foaming systems.

Polystyrene is commercially available in the form of pre-expanded beads which are heat-expandable and fusible to a foam structure. Such materials have been employed to foam fill hollow floats, using steam jets to provide the heat required for expansion. Polystyrene beads are much cheaper than polyurethane foam reactants. However, such polystyrene bead expansion process suffers from the drawbacks that several openings are required for the steam jets and must be closed water tight by welding or the like before the float can be used and free water formed upon steam condensation remains in the float or must be permitted to evaporate from the interior of the float, necessitating a long dry-out storage period. In addition, the foam structure which is achieved is rather poor, with pockets of loose non-expanded beads in areas where the steam could not reach.

SUMMARY OF INVENTION

In accordance with the present invention, there is provided a novel process for foam formation in an enclosed space based on expansion of polystyrene or other thermoplastic beads which does not suffer from the drawbacks of the prior art. The present invention utilizes microwave energy and water heated by such microwave energy to effect rapid and effective expansion of the beads to a foam structure.

In the enclosed environment of the float, boiling of the water by the application of microwave energy is insufficient to permit foam formation within a reasonable period of time. The beads do not soften sufficiently to permit the beads to expand. In accordance with the present invention, a water soluble salt is added to the water in an amount sufficient to raise the boiling point of the water to a temperature at which satisfactory expansion and foam formation can be rapidly achieved.

GENERAL DESCRIPTION OF INVENTION

The quantity of water-soluble salt should not be sufficiently high as to raise the temperature above the softening point of the material of construction of the enclosure. Generally, a sufficient quantity of the water-soluble salt is added to provide a boiling temperature for the water in the range of about 105° to about 115° C.

It is important for full foam expansion for the quantity of water present to be sufficient to permit continued energy transfer during the process. Steam produced as a result of boiling the water may be permitted to vent from the enclosure, so that a minimal quantity of water remains in the foamed structure. Generally, the quantity of water used is about 25 to about 75 wt. % of the weight of beads employed, preferably about 25 to 50 wt. %.

A variety of water-soluble salts may be employed alone or in admixtures to achieve the elevation of the boiling point of water into the desired range. Maximum elevation of the water boiling point is achieved at saturation of the aqueous solution by the dissolved salt.

For most salts and mixtures of salts, the temperature remains substantially constant at a boiling point throughout the foaming step, with salt precipitating from the saturated solution as water is removed by boiling.

For some salts and mixtures of salts, such as sulfates, no salt precipitates and the temperature continuously rises as water is removed by boiling. In such cases, the temperature nonetheless may be substantially constant during foaming if only a small proportion of water is lost during boiling.

Among the salts which may be used are sodium chloride, magnesium sulphate, mixtures of sodium chloride and potassium sulphate, mixtures of sodium chloride and potassium iodide, potassium bromide and mixtures of sodium chloride and potassium bromide. In view of its ready availability, cheapness and sharply-defined saturation point, it is preferred to use sodium chloride alone.

The quantity of water-soluble salt employed usually is that necessary to saturate the aqueous solution, since otherwise energy is employed evaporating water at lower temperatures than those achieved at saturation, with ineffective expansion occurring at such lower temperatures. For sodium chloride, saturation is achieved at approximately 28 wt. % NaCl and produces a boiling point of about 109° C.

It is preferred to provide an even distribution of the aqueous solution of water-soluble salt and a continuous water film over the surfaces of the expandable polystyrene beads, so as to promote an even distribution of energy within the cavity where the expansion is occurring, and to achieve a uniform and even expansion of the beads to form the foam.

Such uniform distribution may be achieved by a novel filling apparatus for filling enclosed containers or shells, such as floats or other totally-enclosed objects, with expandable thermoplastic beads. The apparatus comprises an auger for transporting the beads from a source to the inlet to the enclosure and a fine spray atomizer located at the outlet of the auger for spraying the beads evenly with the water-soluble solution, so as to cover each of the individual with solution as it enters the enclosure.

To promote wetting of the hydrophobic surface of the beads and to promote even distribution of the salt solution over the outer surface of each bead, a small quantity of surfactant may be present in the aqueous salt solution.

The thermoplastic material beads used in this invention are usually formed of polystyrene, since such expandable polystyrene beads are readily available. The beads may be in a pre-expanded form capable of undergoing further expansion. Supplementary blowing agents may be employed to achieve accelerated expansion, if desired.

Complete expansion and consolidation of the beads into a foam structure is effected rapidly upon application of microwave energy and is usually complete in less than about 5 minutes, preferably about 20 seconds to 1 minute, a considerably shorter period of time than is achieved by any other known process. The rapid heating and cool down achieved also lead to a short cycle time. The expansion is uniform and generally 100% complete, again in complete contrast to the prior art.

sion, regardless of oven time. It was concluded that addition of water was required to cause heating.

Three sets of runs then were performed, as described below. In all cases, bottles were filled with a known weight of beads, liquid was added to a known weight, and the bottles were tumbled to distribute the liquid. The bottles then were placed in the centre of the oven with the cap applied loosely. After oven exposure and cooling, the bottles were cut open and the foam examined.

In a first set of runs, the quantity of water and oven time were varied and the results observed. The results obtained are set forth in the following Table I:

TABLE I

| | WATER AS MICROWAVE ABSORBER; 1.055 LITER BOTTLES | | | | | |
|---|---|---|---|---|---|---|
| Sample | wt of polystyrene, g. | wt of $H_2O$ | % $H_2O$ | time in oven, minutes | density of product lb/ft$^3$ | observations |
| 1 | 16.69 | 25.04 | 150% | 12 | 0.99 | Fusion except for the top most part of the container |
| 2 | 16.47 | 24.71 | 150 | 15 | 0.97 | Much better fusion at top |
| 3 | 15.78 | 15.78 | 100 | 12 | 0.93 | Not fused as well as the sample using 150% $H_2O$ for 15 min. |
| 4 | 15.69 | 7.85 | 50 | 12 | 0.93 | Mostly fused but with a very loose top. |
| 5 | 15.69 | 11.72 | 75 | 12 | 0.93 | Sample fused except for extreme top part |
| 6 | 16.67 | 8.34 | 50 | 25 | N/A | Dramatic decrease in volume |

In a second set of runs, the same variables were made as in the first set, except that a saturated solution of sodium chloride was employed. The results obtained are set forth in the following Table II:

TABLE II

| | SAT. NaCl SOLUTION AS MICROWAVE ABSORBER; 1.055 LITER BOTTLES | | | | |
|---|---|---|---|---|---|
| Sample | wt of polystyrene, g. | wt of brine, grams | % brine | time in oven, minutes | observations |
| 1 | 15.79 | 23.99 | 150 | 40 sec. | Very poor fusion |
| 2 | 16.20 | 24.36 | 150 | 5 | Dramatic decrease in volume |
| 3 | 16.48 | 24.72 | 150 | 1 | Very good fusion |
| 4 | 16.23 | 24.35 | 150 | 0.5 | Very poor fusion |
| 5 | 15.87 | 8.44 | 50 | 0.5 | Poor fusion except for the middle |
| 6 | 17.0 | | 50 | 0.83 | Much better |
| 7 | 16.53 | | 50 | 1 | Very good fusion all the way to completion |
| 8 | 16.35 | | 25 | 1 | Good expansion |

EXAMPLE

Pre-expanded polystyrene beads capable of undergoing further expansion were purchased from a commercial supplier (Reach Plastics, Mississauga, Ontario, Canada) and were subjected to microwave heating in 1.055 litre heavy-walled high density polyethylene bottles (Nalge Corporation) in a domestic microwave oven (General Electric model JX 221-1).

Preliminary tests, in which dry beads were attempted to be expanded, produced negligible heating and expan- As can be seen from these results, good foam formation and expansion were obtained at brine loading levels of 25 to 50 wt. % of the beads for an exposure time of approximately 1 minute. By comparison, 12 minutes of heating were required where only water was employed (Table I) as the heating medium.

A third set of runs was undertaken to determine minimum foam density. The results are set forth in the following Table III:

TABLE III

| | DENSITY MINIMIZATION; SAT. NaCl SOLUTION; 1.0 LITER BOTTLES | | | | | |
|---|---|---|---|---|---|---|
| Sample | wt of polystyrene, g. | wt of brine, grams | % brine | time in oven, minutes | Density | Observations |
| 1 | 14.53 | 21.8 | 150 | 2.0 | 0.86 | Good cohesion |
| 2 | 9.42 | 12.7 | 134 | 2.0 | — | Cohesion but shrinkage |

TABLE III-continued

| | | DENSITY MINIMIZATION; SAT. NaCl SOLUTION; 1.0 LITER BOTTLES | | | | |
|---|---|---|---|---|---|---|
| Sample | wt of polystyrene, g. | wt of brine, grams | % brine | time in oven, minutes | Density | Observations |
| 3 | 8.3 | 12.7 | 134 | 1.0 | 0.49 | Moderate cohesion |
| 4 | 5.6 | 6.7 | 120 | 1.0/16 h/1.0 min/ 75 h/1.0 min/24 h/1.0 min (multiple heatings) | 0.33 | Good cohesion, some shrinkage |
| 5 | 6.41 | 8.52 | 132 | 1.0/72 hr/1.0 (multiple heatings) | 0.50 | Good cohesion but slight shrinkage |

The results of this Table III show expansion beginning with 1.0 lb/cu.ft. beads produced a partially consolidated foam at as low as 0.5 lb/cu.ft. in a single heating pass.

SUMMARY OF DISCLOSURE

In summary of this disclosure, the present invention provides a novel method of foam filling an enclosed cavity or container, such as a marine float, by using microwave energy to apply heat to expand foamable polystyrene or other thermoplastic beads via an aqueous solution of a water-soluble salt, notably a saturated solution of sodium chloride, uniformly distributed over the surface of the beads. Modifications are possible within the scope of this invention.

What we claim is:

1. A method of forming a consolidated foam structure within an enclosed space, which comprises:
    providing in said enclosed space beads of foamable synthetic thermoplastic polymer capable of expansion to a fully-foamed state and an aqueous solution of a water-soluble salt in the weight proportion of about 25 to about 75 wt. % of the thermoplastic polymeric beads substantially uniformly distributed over the surface of the beads, and
    applying microwave energy to said aqueous solution to boil the same and cause expansion and cohesion of said beads into a foam structure.

2. The method of claim 1 wherein said thermoplastic material is polystyrene.

3. The method of claim 2 wherein said polystyrene beads are in the form of partially-expanded beads capable of further expansion.

4. The method of claim 1 wherein said aqueous solution of water-soluble salt has a boiling point in the range of about 105° to about 115° C.

5. The method of claim 4 wherein said water-soluble salt is sodium chloride.

6. The method of claim 5 wherein said aqueous solution of sodium chloride is uniformly applied to the beads as a saturated aqueous solution thereof.

7. The method of claim 1 wherein said aqueous solution is spray-applied to the beads during feed thereof into the enclosed space to provide said uniform distribution of aqueous solution on said beads.

8. The method of claim 7 wherein said aqueous solution comprises about 25 to about 50 wt. % of the weight of said beads.

9. The method of claim 8 wherein said enclosed space is provided by the interior of a marine float molded from polyethylene.

10. The method of claim 1 wherein said aqueous solution also contains a surfactant.

11. A method of claim 1 wherein a proportion of scrap foam also is present.

* * * * *